Nov. 1, 1960  J. W. SCHUETZ  2,958,518
FURNACE THREADING METHOD AND APPARATUS
Filed May 8, 1957  3 Sheets-Sheet 1
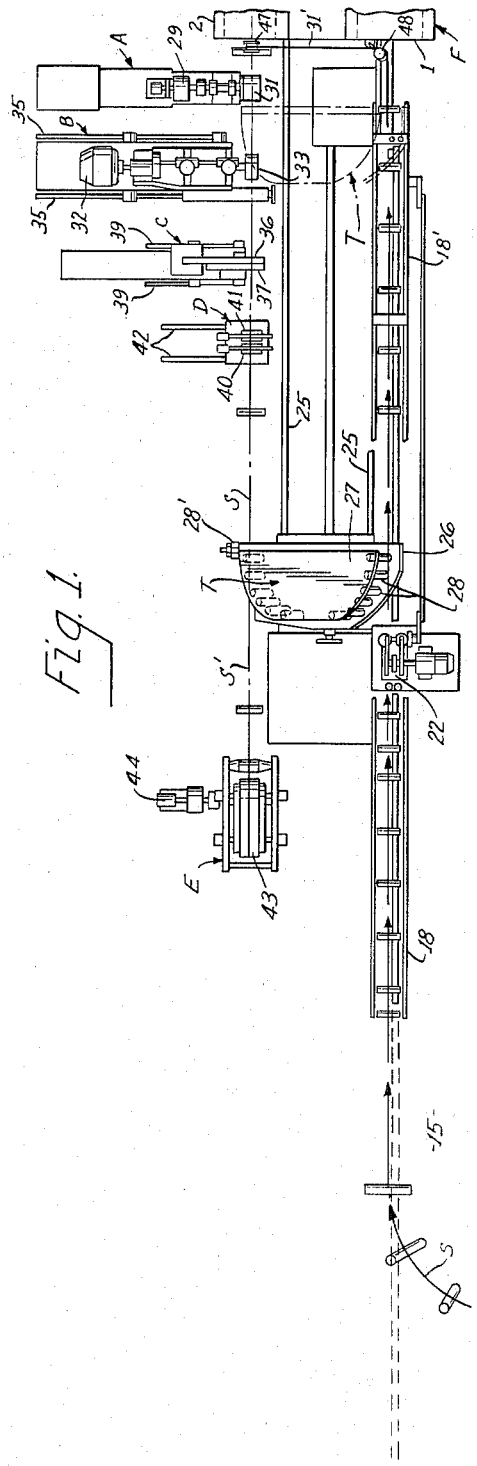
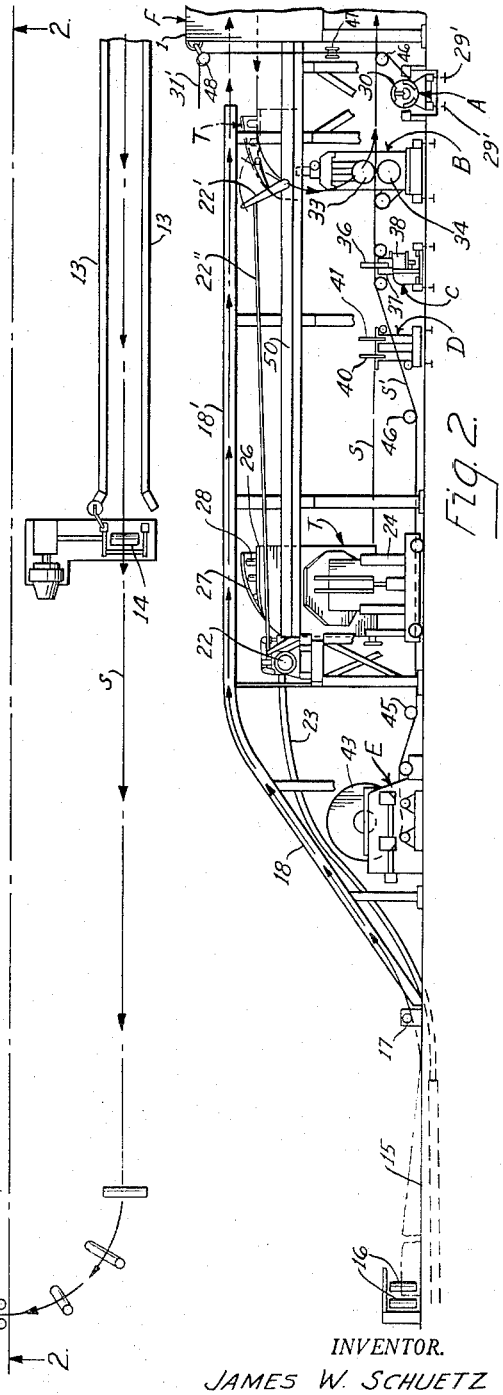
INVENTOR.
JAMES W. SCHUETZ
BY Bosworth, Sessions,
Herstrom & Knowles
ATTORNEYS.

Nov. 1, 1960
J. W. SCHUETZ
2,958,518
FURNACE THREADING METHOD AND APPARATUS
Filed May 8, 1957
3 Sheets-Sheet 2
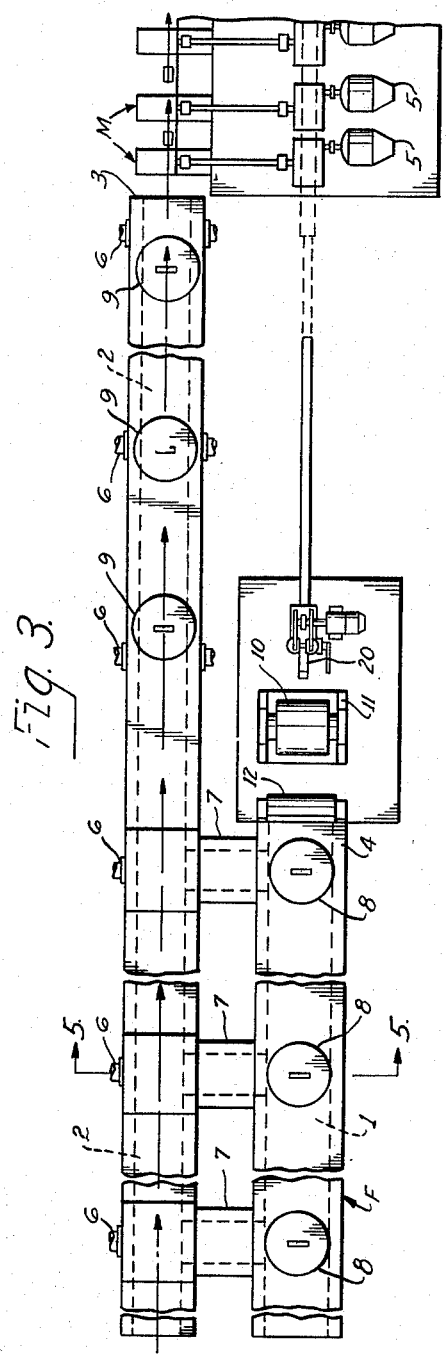
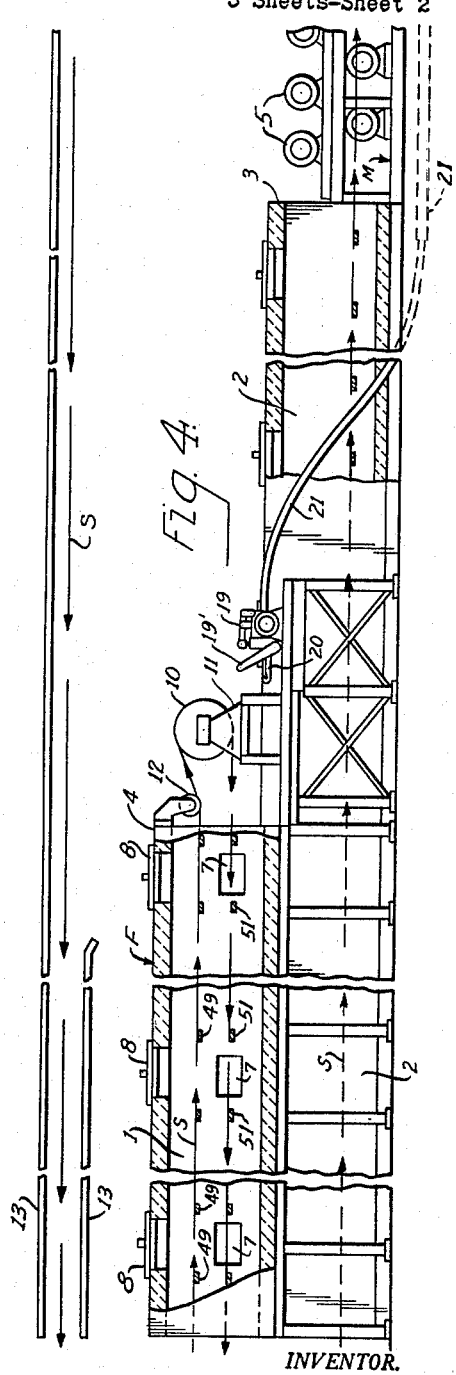
INVENTOR.
JAMES W. SCHUETZ
BY
Bosworth, Sessions,
Herrstrom & Knowles
ATTORNEYS.

Nov. 1, 1960 J. W. SCHUETZ 2,958,518
FURNACE THREADING METHOD AND APPARATUS
Filed May 8, 1957 3 Sheets-Sheet 3

INVENTOR.
JAMES W. SCHUETZ
BY
Bosworth, Sessions,
Herrstrom & Knowles
ATTORNEYS.

_United States Patent Office_

2,958,518
Patented Nov. 1, 1960

2,958,518
FURNACE THREADING METHOD AND APPARATUS

James W. Schuetz, Pittsburgh, Pa., assignor, by mesne assignments, to Blaw-Knox Company, Pittsburgh, Pa., a corporation of Delaware Filed May 8, 1957, Ser. No. 657,815

12 Claims. (Cl. 263—3)

This invention relates to a method of and apparatus for threading skelp into and through a continuous furnace for heating said skelp preparatory to forming and butt welding thereof into pipe.

In the manufacture of buttweld pipe, hot rolled steel strip, commonly called skelp, is heated by passing continuously through a suitable furnace and the heated skelp then formed into tube or pipe by forming rolls or the like. The abutting edges of the pipe are caused to be welded together by pressure producing means, and the continuously moving finished pipe is cut into the desired lengths by a hot saw or other cut-off means.

A recently developed furnace for heating moving skelp to welding temperature includes a pre-heating chamber and a main heating chamber disposed in laterally and vertically offset relation to each other. In this type of furnace the skelp enters an elongated pre-heating chamber, passes longitudinally therethrough, around a turning roll, and back again through the pre-heating chamber in the opposite direction. The skelp leaving the pre-heating chamber is guided downwardly and laterally by means of a turnaround and then passes through the main heating chamber in the same direction as its initial movement through the pre-heating chamber. Heat is applied to the skelp in the main heating chamber by burners which preferably are directed against the edges of the moving skelp, and passages are provided between the main heating chamber and the pre-heating chamber whereby the hot products of combustion from the main heating chamber pass into and through the pre-heated chamber before exiting to a flue or stack. This type of furnace has proved to be very efficient as compared to the older type of straight-through continuous furnace where the skelp moves in one direction only through a single long furnace chamber.

In starting the operation of a butt welding installation incorporating the double chamber furnace described above, the skelp must be fed through the pre-heating chamber, around the roll at the end of the pre-heating chamber, back in the opposite direction through the pre-heating chamber, and then led along the turnaround unit and drawn through the main heating chamber to the forming rolls. Light gauge skelp, such as is used in making pipe up to about one inch in diameter, may be threaded through this type of furnace and bent around the several direction changing means by manual manipulation without too much difficulty. However, when it is desired to make pipe up to say three or four inches in diameter requiring skelp having a width of 13 to 15 inches and a thickness up to ¼ inch, the strip material is so stiff and unwieldy that it cannot be manually bent and manipulated to properly thread the furnace.

Accordingly, it is an object of the present invention to provide improved means for feeding skelp into and through a heating furnace of the type described above. Other more specific objects of my invention include the provision of means for feeding relatively wide, thick and stiff skelp or strip into and through a heating furnace which requires the direction of movement of the skelp to be reversed several times; the provision of skelp threading means which largely eliminates manual manipulation of the skelp, which is adapted to complete the feeding operation in a relatively short time, and which makes possible the employment of a heating furnace having laterally offset pre-heating and main heating chambers in the production of relatively large sizes of pipe.

The above and other objects of my invention will appear from the following description of one embodiment thereof, reference being had to the accompanying drawings in which:

Figure 1 is a plan view of that portion of my improved furnace threading apparatus which is disposed at the entry end of the furnace.

Figure 2 is an elevational view of the furnace threading apparatus shown in Figure 1, taken substantially on line 2—2 of Figure 1.

Figure 3 is a plan view which constitutes a continuation of the plan view of Figure 1 and illustrates the main body of the furnace and the mill end thereof.

Figure 4 is an elevational view of the apparatus shown in Figure 3, being partly in section for illustrative purposes.

Figure 5:
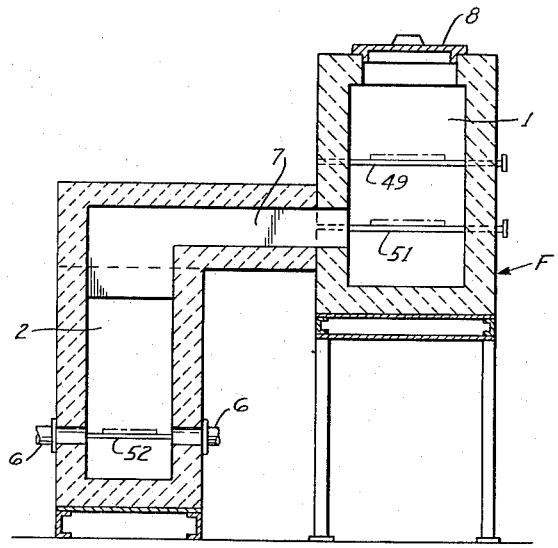
Figure 5 is an enlarged vertical cross-sectional view, taken substantially on line 5—5 of Figure 3, illustrating the transverse cross sectional form of the furnace.

The furnace in which the skelp is heated is indicated generally at F in the drawings and includes an elevated elongated pre-heating chamber 1 and a main heating chamber 2 parallel to but laterally offset from pre-heating chamber 1 and disposed at a lower level (see Figure 5). As is seen in Figures 1 and 2, the entry ends of the pre-heating and main heating chambers 1 and 2 are aligned, but the main heating chamber 2 is somewhat longer than pre-heating chamber 1 so that the mill end 3 of the main chamber extends beyond the corresponding mill end 4 of pre-heating chamber 1. I have diagrammatically illustrated at M a set of pipe forming rolls which are disposed at the mill or exit end of the main heating chamber 2 and are adapted to form the flat skelp into tubular form preparatory to welding in the usual manner. The forming rolls of mill M may be driven in any suitable manner, as by motors 5, and serve to pull the skelp through the furnace F.

A plurality of fuel burners 6 are mounted in opposed relation along the opposite sides of the main heating chamber 2 and are adapted, when the furnace is in operation, to direct the flames of the burning fuel against the edges of the skelp moving through the main heating chamber. A series of spaced transverse flues 7 connect the upper portion of the main heating chamber 2 to the pre-heating chamber as is seen clearly in Figure 5. Thus the products of combustion will pass from the main heating chamber into the pre-heating chamber and may be withdrawn therefrom at spaced intervals along the length thereof by suitable flues and suction fans (not shown) and discharged through a stack in well-known manner. To facilitate certain of the threading operations, as will be later described, removable bungs 8 are spaced along the top of the pre-heating chamber 1, and similar removable bungs 9 are spaced along the top of the main heating chamber 2. To reverse the direction of travel of the skelp at the mill end of the pre-heating chamber 1, an idle roller 10 is mounted on a suitable support 11, and the hold down roller 12 assists in maintaining the proper path of the skelp in its first pass through the pre-heating chamber.

Before describing my furnace threading apparatus in detail, it is pointed out that skelp from the usual looping zone enters side guides 13 (Figures 1 and 3) and passes through a pair of driven feed rolls 14. The looping zone is not shown as it forms no part of the present invention and is well-known in this art. It will suffice to say that it provides sufficient slack in the advancing skelp to permit continuous feed of skelp through the furnace while the ends of successive coils are being welded together. The pass line of the skelp being fed to and through the furnace from the looping zone is indicated at S, and it will be observed that as the skelp leaves the feed rolls 14, it is guided around and its direction reversed on an up-loop table 15.

As seen in Figure 2, the up-loop table or secondary looper 15 includes a pair of spaced vertical rollers 16 which are so arranged that, if the skelp passing therebetween engages the outer roller 16, the speed of the feed rolls 14 is reduced, and, if it engages the inner roller 16, the speed is increased, thus coordinating the rate of feed of skelp to the furnace F with the speed of the skelp through the forming mill M.

As the skelp leaves the secondary looper 15, it passes under a guide roller 17 (Figure 2) to an inclined roller conveyor 18 which elevates the skelp to the desired level for passage into the first pass through the pre-heating chamber 1. The conveyor 18 reaches the desired elevation some distance in advance of the entry end of pre-heating chamber 1 and continues as a horizontal conveyor 18' up to a point adjacent the furnace F. As the skelp leaves the conveyor 18', it passes into the pre-heating chamber 1 and moves through the upper portion thereof and around the idle roller 10 which reverses its direction. The skelp then moves back through the pre-heating chamber 1 in the opposite direction and, after leaving the pre-heating chamber, is guided downwardly and laterally by the turnaround unit generally indicated at T. When the skelp leaves turnaround unit T, it is in proper position to enter the main heating chamber 2 and passes therethrough from left to right as indicated in Figure 4. When the skelp leaves the main heating chamber 2, it has been brought to proper temperature for welding, and it then moves into the driven forming rolls of the mill M which, after the skelp is fed through the furnace, are effective to pull the skelp from the point where it leaves the secondary looper 15 through all of the several passes in the furnace F. It will be understood that, after the skelp is threaded through the furnace in the first instance, the heating, forming and welding operations are continuous.

As previously noted, it is not possible initially to thread heavy stiff skelp, such as that required to make three or four inch steel pipe, manually through the furnace and around the various rollers, guide means, etc. In order to perform this threading operation, I have provided the apparatus which will now be described.

Supported adjacent the mill end 4 of the pre-heating chamber 1 is a pair of power driven mill end threading pinch rolls 19 through which a mill end threading "needle" 20 passes and which are adapted to advance or retract this needle as will be later described. The needle 20 consists of a long flat bar, preferably of stainless steel or the like, which in a typical installation may be about 2" wide by ½" thick and about 170' long. The skelp engaging end of needle 20 has a hook formed thereon for engaging a hole in the end of the skelp as will appear more fully later, and the needle is housed and guided in a tube or pipe 21 which preferably extends below the floor level for a sufficient distance to house the fully retracted needle 20.

Spaced some distance in advance of the entry end of pre-heating chamber 1 below the conveyor 18 is another set of power driven entry end threading pinch rolls 22 which are adapted to advance and retract an entry end threading needle substantially similar to needle 20 just described. This entry end threading needle is housed in and guided by a tube or pipe 23 which also preferably extends below the floor line in the opposite direction from guide tube 20 and is long enough to house the entry end threading needle which also has a hook formed on its forward end for engaging the hole in the end of the skelp.

Mounted on trackways for movement toward and away from the skelp line adjacent the entry end of main heating chamber 2 are, in order of their proximity to the entry end of the furnace, a scrap coiler and cable drum unit generally indicated at A, a furnace threading machine generally indicated at B, a shear generally indicated at C, and a clamping table generally indicated at D. Also in alignment with the shear pass line leading into the main heating chamber 2, but spaced some distance from the clamping table D, is a motor driven coil box E adapted to support a coil 43 of threading skelp of the same type and size as the skelp which enters the furnace from the secondary looper 15. The functions and general arrangements of the elements referred to above will be described later.

In referring to the general path of travel of the skelp through the furnace, the turnaround unit T was previously mentioned. As seen in Figures 1 and 2, this unit consists of a wheel supported carriage 24 adapted to travel toward or away from the furnace F on spaced floor level tracks 25. Mounted on the carriage 24 are a pair of angularly disposed guide and roller carrying plates 26 and 27 which incline downwardly with their upper ends generally in the pass line of the skelp as it leaves the pre-heating chamber 1 and their lower ends generally in the pass line of the skelp as it enters the main heating chamber 2. A plurality of idler rollers 28 extend between the plates 26 and 27, serve to guide the skelp downwardly and transversely, and to reverse its direction, as it leaves the pre-heating chamber 1 and enters the main heating chamber 2. Power means, not shown, are provided for moving the carriage 24 along the tracks 25 and brake means, also not shown, are provided for locking the carriage 24 at any desired position on the tracks. A skelp clamp 28' is also supported on the carriage 24 in order to lock the skelp and prevent relative movement therebetween when desired. As seen in Figure 1, the units A, B, C and D have all been advanced on their transverse track supports into positions where their operating or skelp engaging parts lie on the pass line of the skelp entering the main heating chamber 2. These are the positions in which these units are disposed during threading of the skelp through the furnace, but, upon completion of the threading operation, they are moved back on their supporting tracks so that they completely clear the skelp pass line and permit the turnaround T to be moved up into close proximity with the entering end of main heating chamber 2 as will be later explained.

The scrap coiler and cable drum unit A is supported on tracks 29' (see Figure 2) and consists essentially of a driving motor 29 connected through suitable drive means to an expanding mandrel 30. This expanding mandrel 30 is adapted to be employed to grip the end of a length of skelp in the main heating chamber and coil it up and pull it out of the furnace if it becomes necessary to do so. Mandrel 30 is also adapted to support a cable drum 31 for taking in a flexible wire rope cable or the like during certain of the skelp threading steps.

The furnace threading machine B is supported on tracks 35 for movement toward and away from the skelp pass line S. This unit includes a driving motor 32 and a pair of skelp feeding rolls 33 and 34 driven thereby. Means are provided for separating and bringing together the rolls 33 and 34 so that skelp may be fed thereinto and gripped therebetween. Furthermore, the skelp engaging face of upper roll 33 is slightly concave and the skelp engaging face of lower roll 34 is correspondingly convex so that, when these rolls grip the skelp and feed it toward the furnace F, the skelp will be dished in transverse cross-section to add rigidity and stiffness thereto as will be referred to later.

Next to the furnace threading machine B is a power shear C. This includes upper and lower shear blades 36 and 37 disposed transversely to the skelp pass line S and adapted to be actuated by a suitable power means such as the fluid pressure cylinder 38. The shear C is supported on tracks 39, in a manner similar to units A and B, for movement into and out of the position seen in Figure 1 in which the blades are in the path of movement of the skelp and adapted to shear same when desired. After completion of the skelp threading operation, shear C may be moved on its tracks 39 out of the skelp pass line.

Just beyond the shear C, in a direction away from the entry end of main heating chamber 2 of the furnace, is a clamping table D having a pair of spaced clamps 40 and 41 adapted to clamp the adjacent ends of the skelp being handled and hold them in abutting relation to permit welding as will be later described. Clamping table D is supported for movement on tracks 42 in the same manner and for the same purposes as units A, B and C.

Disposed on an extension S' of the pass line S of the skelp which is being moved through the furnace is the coil box E adapted to support a coil 43 of threading skelp. This coil box is power actuated by motor 44 to facilitate unwinding skelp from the coil or winding it back onto the coil. Skelp from coil 43 is led off from the lower side thereof under suitable guide rolls 45 and 45'.

The operation of the above described apparatus for threading skelp into and through the furnace F will now be described. Assuming that skelp from the main looping zone has been moved around the secondary looper 15 by the feed rolls 14 and has its forward end adjacent the guide roller 17 at the foot of the inclined roller conveyor 18, and that a hole has been drilled or cut in the end of the skelp to receive the several skelp pulling devices, the cable drum 31 is positioned on and secured for rotation with the mandrel 30 on the skelp coiler A. This, in effect, provides a cable winch for a wire rope or cable 31' which is wound around the cable drum 31 and threaded through guide roller 46 and guiding snatch blocks 47 and 48 and over the top of the roller conveyor 18—18' to the end of the skelp adjacent guide roller 17. This cable 31' is provided with a hook at its end which is secured in the hole in the end of the skelp, and the cable drum on the coiler A is now operated to wind in the cable and pull the skelp up the inclined conveyor 18 and along the horizontal portion 18' thereof to a point adjacent the entry end of the pre-heating chamber 1 in substantial alignment with the upper skelp pass line therethrough. The cable hook is now removed from the hole in the skelp and the cable 31' pulled back through the snatch blocks 48, 47 and 46 and wound on the drum 31.

While the skelp is being pulled up over the conveyor 18—18', the mill end needle 20 is advanced by the threading pinch rolls 19 through the pre-heating chamber 1 until its hooked end is in position to be inserted into the hole in the leading end of the skelp. The pressure of the pinch rolls 19 on the needle 20 may be regulated by lever 19' and, while the needle 20 is being advanced through the pre-heating chamber as above described, the pressure is set light so that if the end of the needle strikes an obstruction in the furnace the pinch rolls will skid until the needle can be freed, and bending of the needle is thus prevented.

After the needle 20 is hooked to the skelp, the pressure of pinch rolls 19 is increased to provide a proper grip on the needle, and the rolls are reversed to pull the skelp through the pre-heating chamber 1. As the skelp advances it is lifted manually, by hooks or the like which are inserted through the bungs 8 in the top of the furnace, to a point slightly above the upper skelp pass line and skid bars 49 (Figures 2 and 5) are inserted through holes in the sides of the pre-heating chamber 1 to support the skelp as indicated in Figures 4 and 5.

As the skelp is being pulled through the pre-heating chamber as described above, the second or entry end needle 22 is advanced by pinch rolls 22 along a guide trough 50 and through the pre-heating chamber 1 until its hooked end is approximately at the mill end 4 of the pre-heating chamber. A short length of wire cable, having a hook at each end, is now attached at one end to the hole in the skelp and led around the idle roller 10 and its other end attached to the hook on the end of the entry end needle. The pressure of the pinch rolls 22 on the needle is now increased to heavy by moving lever 22' and connecting link or bar 22'' and the needle is drawn back into the pre-heating chamber 1, thus pulling the skelp around the idle roller 10. When the skelp is entirely around roller 10, the needle is moved toward the end of the skelp so that the cable can be removed and the hooked end of the needle is then positioned in the hole in the end of the skelp. As the threading needles are flat and are engaged on their opposite sides by the pinch rolls, they will not twist or rotate as they are fed into or out of the furnace. Accordingly they will also restrict the skelp from twisting as it is pulled through the furnace.

Next the pinch rolls 22 are operated to move the entry end needle back into its casing 23 and draw the skelp back through the pre-heating chamber 1. As the skelp advances it is again manually lifted to the lower pass line in the pre-heating chamber by hooks inserted through bungs 8, and skid bars 51 are inserted through holes in the side walls of the furnace to form proper supports for the skelp in its return movement through the pre-heating chamber 1 (see Figures 4 and 5).

While the skelp is being drawn back through the pre-heating chamber 1, the cable 31' on the scrap coiler cable drum 31, which cable was used to pull the skelp up over the conveyor 18—18', is rearranged so that it extends from the drum 31 around roller 46 to and over the rollers 28 of the turnaround T, and the hook on its end is then secured to the hole in the end of the skelp after the entry end threading needle has been removed therefrom.

At this stage in the threading operation, the turnaround T is up close to the entry end of the furnace F (substantially as seen in phantom lines in Figures 1 and 2) and, after the cable 31' which leads from the scrap coiler cable drum 31 around the turnaround T has been secured to the end of the skelp, the slack therein is taken up and the cable drum 31 of the scrap coiler A is locked against rotation. Next the turnaround T is moved back along its tracks 24 away from the furnace until it is near, but not at, the end of its travel. During this operation, the skelp will be pulled around the rollers 28 of the turnaround T because the end of the skelp will be held by the cable and the locked drum on the scrap coiler A. When this backward movement of turnaround T is completed the end of the skelp will be somewhat beyond the shear C in a direction away from the furnace. The furnace threading machine B, the shear C, and the clamping table D are now moved on their tracks from retracted or withdrawn position up into their advanced positions on the skelp pass line as seen in Figure 1.

The scrap coiler A is now operated to wind the cable 31' on the drum 31 and pull the end of the skelp up into the shear C. Then the skelp is clamped at the turnaround T by clamp 28' and the leading end of the skelp, including the hole therein, is sheared off and discarded. The cable 31' is then rewound onto the cable drum 31 and the drum removed from the mandrel 30. When these steps have been completed, the turnaround is moved further back away from the furnace until the squared sheared end of the skelp is positioned in the clamp 40 of the clamping table D. The brake on the turnaround carriage 24 is now locked so that turnaround T will not move along its tracks.

Skelp from the threading coil 43 in the coil box E is now fed past guide rolls 45 and 45' below the clamps 40 and 41 of the clamping table D, through the open blades of the shear C and into the rolls 33, 34 of the furnace threading machine (see Figure 2). The pass line of this length of threading skelp is indicated at S' on Figures 1 and 2.

After the end of the threading skelp from coil 43 has been entered between the rolls 33 and 34 of the furnace threading machine B, these rolls are adjusted to grip the skelp therebetween and the leading end is preferably tapered and bent upwardly to facilitate sliding of the skelp through the main heating chamber 2. The furnace threading machine is now started and the rolls 33 and 34 camber the threading skelp as previously described and push it forward through the main heating chamber 2 across the top of skid bars 52 (see Figure 5) which extend thereacross until the end of the threading skelp reaches the forming mill end 3 of the main heating chamber 2.

If for any reason this operation of threading skelp from threading coil 43 through the main heating chamber is not successful, this skelp is cut with the shear C and the end secured on the mandrel 30 of the scrap coiler A and the coiler operated to pull the length of skelp out of the main heating chamber to get it out of the way for a second attempt. Mandrel 30 is of the well-known collapsible type so that the coil of withdrawn scrap skelp can readily be removed therefrom.

An additional length of threading skelp, for example 8 to 10 feet, is run into the main heating chamber 2 by the furnace threading machine, and the threading skelp is then sheared by the shear C, through which it has been passing, and the cut end of the threading skelp is run back to the clamping table D by reversing the furnace threading machine B and is gripped by clamp 41 with its sheared end in abutting relation with the end of the main strip of skelp which was previously gripped in the clamp 40. These two ends are now welded together by an arc or torch weld, the clamps 28', 40 and 41 released, and the clamping table D, shear C, furnace threading machine B, and scrap coiler A are all moved back on their supporting tracks out of the skelp pass line S.

The end of the skelp is then manually brought out of the main heating chamber 2, which is at warm up temperature, and guided into the rolls of the forming mill M. It is advanced therein by driving the mill rolls until they have a firm grip on the skelp and are able to pull it through the furnace all the way from the secondary looping table 15. The furnace burners are now turned up, the mill M started and the length of threading skelp from coil 43, which was fed through the main heating chamber 2 by furnace threading machine B, will be drawn through furnace chamber 2 and will pull along with it the main skelp which has been welded to its trailing end. As the temperature of the skelp is brought up to the desired value, the mill speed will be increased until optimum heating and welding conditions are reached. After the mill is operating and the skelp is moving through the furnace, the brake on the turnaround unit T is released and the turnaround is moved forward on its tracks 25 until the upper and lower ends of the plates 26 and 27 are closely adjacent the entry end of the pre-heating chamber 1 and the entry end of the main heating chamber 2 respectively. In this position turnaround T is closer to the end of the furnace than the phantom line position shown in Figures 1 and 2 and the length of the path of travel of the skelp as it moves from the pre-heating chamber to the main heating chamber is reduced to a minimum.

From the above description of a complete threading operation employing my improved apparatus, it will be seen that relatively wide and thick skelp, which is too unwieldy and stiff to be handled manually, may readily be threaded through the furnace by power operated means, thus making possible the employment of this type of heating furnace in the manufacture of much heavier and larger pipe than was possible prior to my invention.

Although I have described the illustrated embodiment of the present invention in considerable detail, it will be understood that variations and modifications will be made in the specific form and arrangement of the various elements of my apparatus, and in the procedure followed in threading the skelp through the furnace, without departing from the spirit of the invention. I do not, therefore, wish to be limited to the exact structures, devices, and procedures herein illustrated and described but claim as my invention all embodiments coming within the scope thereof of the appended claims.

I claim:

1. In combination with a heating furnace for the continuous heating of skelp having a pre-heating chamber and a parallel but offset main heating chamber, said furnace being disposed ahead of a pipe forming mill and said chambers each having a mill end adjacent said forming mill and an entry end remote from said forming mill, a turnaround disposed to guide skelp leaving said entry end of said pre-heating chamber to said entry end of said main heating chamber, flexible skelp pulling means adapted to be secured at one end to the leading end of the length of skelp being fed through the furnace at the point where said leading end leaves said entry end of said pre-heating chamber and to extend around said turnaround when said turnaround is disposed adjacent said entry ends of said furnace chambers, means for anchoring the other end of said skelp pulling means adjacent the entry end of said main heating chamber, means for moving said turnaround toward and away from said entry end of said furnace, and releasable means for locking said turnaround at various distances from said entry end of said furnace.

2. In combination with a heating furnace for the continuous heating of skelp having a pre-heating chamber and a parallel but laterally and vertically offset main heating chamber, said furnace being disposed ahead of a forming mill and said chambers each having a mill end adjacent said forming mill and an entry end remote from said forming mill, a turnaround including a carriage mounted for movement toward and away from the entry end of said furnace and skelp guiding means supported on said carriage and disposed to guide skelp leaving said entry end of said pre-heating chamber to said entry end of said main heating chamber, flexible skelp pulling means adapted to be secured at one end to the leading end of a length of skelp being fed through the furnace at the point where said leading end leaves said entry end of said pre-heating chamber and to extend around said turn-around when said turnaround is disposed adjacent said entry ends of said furnace chambers, means for anchoring the other end of said skelp pulling means adjacent the entry end of said main heating chamber, means for moving said turnaround toward and away from said entry end of said furnace, and releasable means for locking said turnaround at various distances from said entry end of said furnace.

3. In combination with a heating furnace having a pre-heating chamber and a parallel but offset main chamber, said furnace being disposed ahead of a pipe forming mill and said chambers each having a mill end adjacent said forming mill and an entry end remote from said forming mill, a turnaround disposed to guide skelp leaving said entry end of said pre-heating chamber to said entry end of said main heating chamber, a flexible cable adapted to be anchored adjacent said entry end of said main heating chamber and extend around said turnaround and be secured to the end of a strip of skelp leaving said entry end of said preheating chamber, means for moving said turnaround toward and away from said entry end of said furnace whereby, when said cable is disposed as noted herein and said turnaround is moved away from said entry end of said furnace, said strip of skelp will be drawn around said turnaround, and releasable means for locking said turnaround at various distances from said entry end of said furnace.

4. In combination with a heating furnace having a preheating chamber and a parallel but laterally and vertically offset main heating chamber, said furnace being disposed ahead of a forming mill and said chambers each having a mill end adjacent said forming mill and an entry end remote from said forming mill, a turnaround including a carriage mounted for movement toward and away from the entry end of said furnace and skelp guiding means supported on said carriage and disposed to guide skelp leaving said entry end of said pre-heating chamber to said entry end of said main heating chamber, a flexible cable adapted to be anchored adjacent said entry end of said main heating chamber and extend around said skelp guiding means on said turnaround and be secured to the end of a strip of skelp leaving said entry end of said pre-heating chamber, means for moving said turnaround toward and away from said entry end of said furnace whereby, when said cable is disposed as noted herein and said turnaround is moved away from said entry end of said furnace, said strip of skelp will be drawn around said guiding means on said turnaround, and releasable means for locking said turnaround at various distances from said entry end of said furnace.

5. In combination with a heating furnace having a preheating chamber and a parallel but laterally and vertically offset main heating chamber, said furnace being disposed ahead of a forming mill and said chambers each having a mill end adjacent said forming mill and an entry end remote from said forming mill, a turnaround including a carriage mounted for movement toward and away from the entry end of said furnace and skelp guiding means supported on said carriage and disposed to guide skelp leaving said entry end of said pre-heating chamber to said entry end of said main heating chamber, a flexible cable adapted to be anchored adjacent said entry end of said main heating chamber and extend around said skelp guiding means on said turnaround and be secured to the end of a strip of skelp leaving said entry end of said pre-heating chamber, means for moving said turnaround toward and away from said entry end of said furnace whereby, when said cable is disposed as noted herein and said turnaround is moved away from said entry end of said furnace, said strip of skelp will be drawn around said guiding means on said turnaround, releasable means for locking said turnaround at various distances from said entry end of said furnace, and releasable means for clamping the skelp to said turnaround and preventing relative movement therebetween.

6. In combination with a heating furnace having a preheating chamber and a parallel but laterally and vertically offset main heating chamber, said furnace being disposed ahead of a forming mill and said chambers each having a mill end adjacent said forming mill and an entry end remote from said forming mill, a turnaround including a carriage mounted for movement toward and away from the entry end of said furnace and skelp guiding means supported on said carriage and disposed to guide skelp leaving said entry end of said pre-heating chamber to said entry end of said main heating chamber, a flexible cable adapted to be anchored adjacent said entry end of said main heating chamber and extend around said skelp guiding means on said turnaround and be secured to the end of a strip of skelp leaving said entry end of said pre-heating chamber, means for moving said turnaround toward and away from said entry end of said furnace whereby, when said cable is disposed as noted herein and said turnaround is moved away from said entry end of said furnace, said strip of skelp will be drawn around said guiding means on said turnaround, releasable means for locking said turnaround at various distances from said entry end of said furnace, releasable means for clamping the skelp to said turnaround carriage and preventing relative movement therebetween, means for supporting a coil of threading skelp on an extension of the skelp pass line through said main heating chamber in advance of said entry end of said main heating chamber, skelp end clamping means supported for movement into and out of said extension of said skelp pass line, skelp shearing means supported for movement into and out of said extension of said skelp pass line, and roll means for feeding threading skelp from a coil on said coil supporting means into said main heating chamber, said roll means being supported for movement into and out of said extension of said skelp pass line.

7. In combination with a heating furnace for the continuous heating of skelp having a pre-heating chamber and a parallel but laterally and vertically offset main heating chamber, said furnace being disposed ahead of a forming mill and said chambers each having a mill end adjacent said forming mill and an entry end remote from said forming mill, means for pulling skelp being threaded through said pre-heating chamber from said entry end to said mill end, an idle roller at said mill end of said pre-heating chamber adapted to guide skelp leaving said pre-heating chamber back into said pre-heating chamber, means for pulling said skelp from said idle roller back through said pre-heating chamber from said mill end to said entry end, a turnaround including a carriage mounted for movement toward and away from the entry end of said chambers and skelp guiding means supported on said carriage and disposed to guide skelp leaving said entry end of said pre-heating chamber to said entry end of said main heating chamber, flexible skelp pulling means adapted to be secured at one end to the leading end of a length of skelp being fed through the furnace at the point where said leading end leaves said entry end of said preheating chamber and to extend around said turnaround when said turnaround is disposed adjacent said entry ends of said furnace chambers, means for anchoring the other end of said skelp pulling means adjacent the entry end of said main heating chamber, means for moving said turnaround toward and away from said entry end of said pre-heating chamber, and releasable means for locking said turnaround at various distances from said entry end of said furnace.

8. In combination with a heating furnace having a pre-heating chamber and a parallel but laterally and vertically offset main heating chamber, said furnace being disposed ahead of a forming mill and said chambers each having a mill end adjacent said forming mill and an entry end remote from said forming mill, means for pulling skelp being threaded through said pre-heating chamber from said entry end to said mill end, an idle roller at said mill end of said pre-heating chamber adapted to guide skelp leaving said pre-heating chamber back into said pre-heating chamber, means for pulling said skelp from said idle roller back through said pre-heating chamber from said mill end to said entry end, a turnaround including a carriage mounted for movement toward and away from the entry end of said chamber and skelp guiding means supported on said carriage and disposed to guide skelp leaving said entry end of said pre-heating chamber to said entry end of said main heating chamber, a flexible cable adapted to be anchored adjacent said entry end of said main heating chamber and extend around said skelp guiding means on said turnaround and be secured to the end of a strip of skelp leaving said entry end of said pre-heating chamber, means for moving said turnaround toward and away from said entry end of said furnace whereby, when said cable is disposed as noted herein and said turnaround is moved away from said entry end of said furnace, said strip of skelp will be drawn around said guiding means on said turnaround, and releasable means for locking said turnaround at various distances from said entry end of said furnace.

9. In combination with a heating furnace having a pre-heating chamber and a parallel but laterally and vertically offset main heating chamber, said furnace being disposed ahead of a forming mill and said chambers each having a mill end adjacent said forming mill and an entry end remote from said forming mill, means for pulling skelp being threaded through said pre-heating chamber from said entry end to said mill end, an idle roller at said mill end of said pre-heating chamber adapted to guide skelp leaving said pre-heating chamber back into said pre-heating chamber, means for pulling said skelp from said idle roller back through said pre-heating chamber from said mill end to said entry end, a turnaround including a carriage mounted for movement toward and away from the entry end of said chamber and skelp guiding means supported on said carriage and disposed to guide skelp leaving said entry end of said pre-heating chamber to said entry end of said main heating chamber, a flexible cable adapted to be anchored adjacent said entry end of said main heating chamber and extend around said skelp guiding means on said turnaround and be secured to the end of a strip of skelp leaving said entry end of said pre-heating chamber, means for moving said turnaround toward and away from said entry end of said furnace whereby, when said cable is disposed as noted therein and said turnaround is moved away from said entry end of said furnace, said strip of skelp will be drawn around said guiding means on said turnaround, releasable means for locking said turnaround at various distances from said entry end of said furnace, and releasable means for clamping said skelp to said turnaround and preventing relative movement therebetween.

10. Apparatus for threading skelp through a heating furnace having a pre-heating chamber and a parallel but laterally and vertically offset main heating chamber, said furnace being disposed ahead of a forming mill and said chambers each having a mill end adjacent said forming mill and an entry end remote from said forming mill, including, a mill end threading needle and means for advancing same into and retracting same from said mill end of said pre-heating chamber, an entry end threading needle and means for advancing same into and retracting same from said entry end of said pre-heating chamber, a skelp turnaround including a carriage mounted for movement toward and away from the entry end of said furnace chambers and guiding means supported on said carriage and disposed to guide skelp leaving said entry end of said pre-heating chamber to said entry end of said main heating chamber, releasable means for locking said turnaround at various distances from said entry end of said furnace, means for securing the leading end of a strip of skelp being threaded into the furnace against movement away from said entry end of said main heating chamber when said skelp is in engagement with said guiding means of said skelp turnaround and said end is positioned between said turnaround and said entry end of said main heating chamber, means for supporting a coil of threading skelp in an extension of the skelp pass line through said main heating chamber in advance of said entry end of said main heating chamber, roll means for feeding threading skelp from a coil on said coil supporting means into said main heating chamber, said roll means being supported for movement into and out of said extension of said skelp pass line, means for cutting off from said coil the trailing end of a length of threading skelp which has been fed into said main heating chamber, and clamping means, supported for movement into and out of said extension of said skelp pass line, for holding said end of said strip of skelp being threaded and said end of said threading skelp in engagement for welding same together.

11. Apparatus for threading skelp through a heating furnace having a pre-heating chamber and a parallel but laterally and vertically offset main heating chamber, said furnace being disposed ahead of a forming mill and said chambers each having a mill end adjacent said forming mill and an entry end remote from said forming mill, including, power driven mill end threading pinch rolls supported adjacent the mill end of said pre-heating chamber, a mill end threading needle extending through said mill end pinch rolls and adapted to be advanced into and retracted from said mill end of said pre-heating chamber by said mill end threading pinch rolls, power driven entry end threading pinch rolls supported adjacent the entry end of said pre-heating chamber, an entry end threading needle extending through said entry end pinch rolls and adapted to be advanced into and retracted from said entry end of said pre-heating chamber by said entry end threading pinch rolls, an idle roller at said mill end of said pre-heating chamber adapted to guide skelp leaving said chamber back into said chamber, a skelp turnaround including a carriage mounted for movement toward and away from the entry end of said chamber and guiding means supported on said carriage and disposed to guide skelp leaving said entry end of said pre-heating chamber to said entry end of said main heating chamber, releasable means for locking said turnaround at various distances from said entry end of said furnace, means for supporting a coil of threading skelp on an extension of the skelp pass line through said main heating chamber in advance of said entry end of said main heating chamber, skelp end clamping means supported for movement into and out of said extension of said skelp pass line, skelp shearing means supported for movement into and out of said extension of said skelp pass line, and roll means for feeding threading skelp from a coil on said coil supporting means into said main heating chamber, said roll means being supported for movement into and out of said extension of said skelp pass line.

12. The method of threading skelp to be heated into and through a heating furnace having a pre-heating chamber and a parallel but laterally and vertically offset main heating chamber, said furnace being disposed ahead of a forming mill and said chambers each having a mill end adjacent said forming mill and an entry end remote from said forming mill, which includes the steps of drawing the leading end of the skelp to be heated through said pre-heating chamber from said entry end to said mill end thereof, reversing the direction of said skelp and drawing said leading end back through said pre-heating chamber from said mill end to said entry end thereof, moving the skelp immediately behind the leading end thereof away from said entry end of said furnace and simultaneously moving said leading end laterally and vertically into alignment with but spaced ahead of the entry end of said main heating chamber, clamping the leading end of said skelp at a point spaced ahead of and in alignment with the entry end of said main heating chamber, advancing a length of threading skelp into and through said main heating chamber and then into said forming mill, clamping the trailing end of said length of threading skelp in engagement with said leading end of the skelp to be heated, welding said ends together, and moving said length of threading skelp through said forming mill whereby said skelp to be heated is drawn through said main heating chamber into said forming mill.

References Cited in the file of this patent

UNITED STATES PATENTS

| Number | Name | Date |
|---|---|---|
| 503,830 | Cook | Aug. 22, 1893 |
| 1,856,444 | Sutton | May 3, 1932 |
| 1,901,702 | Cook et al. | Mar. 14, 1933 |
| 2,178,451 | Jones | Oct. 31, 1939 |
| 2,187,785 | Hoyt | Jan. 23, 1940 |
| 2,238,667 | Wales | Apr. 15, 1941 |
| 2,549,666 | Cope et al. | Apr. 17, 1951 |
| 2,792,206 | Wagner | May 14, 1957 |